March 18, 1930. A. T. OAKLEY ET AL 1,750,813
DRYING APPARATUS
Filed Nov. 10, 1926  9 Sheets-Sheet 1

March 18, 1930.   A. T. OAKLEY ET AL   1,750,813
DRYING APPARATUS
Filed Nov. 10, 1926   9 Sheets-Sheet 4

March 18, 1930. A. T. OAKLEY ET AL 1,750,813
DRYING APPARATUS
Filed Nov. 10, 1926 9 Sheets-Sheet 5

March 18, 1930.  A. T. OAKLEY ET AL  1,750,813
DRYING APPARATUS
Filed Nov. 10, 1926  9 Sheets-Sheet 9

Patented Mar. 18, 1930

1,750,813

UNITED STATES PATENT OFFICE

ALFRED T. OAKLEY, OF THOMPSON, OHIO, AND PAUL LUPKE, JR., OF TRENTON, NEW JERSEY, ASSIGNORS TO ESSEX RUBBER COMPANY, OF TRENTON, NEW JERSEY, A CORPORATION OF NEW JERSEY

DRYING APPARATUS

Application filed November 10, 1926. Serial No. 147,414.

The present invention relates to drying apparatus of the type in which the material to be dried is subjected in more or less finely divided condition to the drying action of a gaseous drying medium.

The object of the invention is to provide an improved drying apparatus that can be economically operated.

The invention has been developed in connection with the construction of apparatus for drying granulated reclaimed rubber and for convenience will be described more particularly in connection with such an apparatus but it will be understood that the particular description is illustrative merely and is not intended as defining the limits of the invention.

The nature and objects of the invention will be better understood from the following description of a selected embodiment thereof for the purposes of which description reference should be had to the accompanying drawings forming a part hereof and in which.

Figure 13:
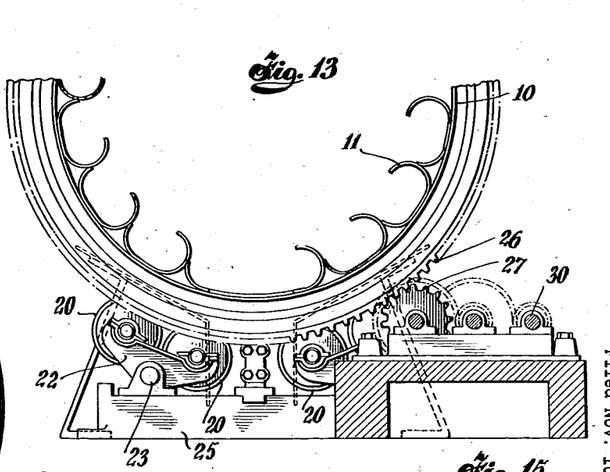
Fig. 13 is a sectional view taken on the line 13—13 of Fig. 4 showing the driving mechanism for rotating the drum.
Figures 14, 15:
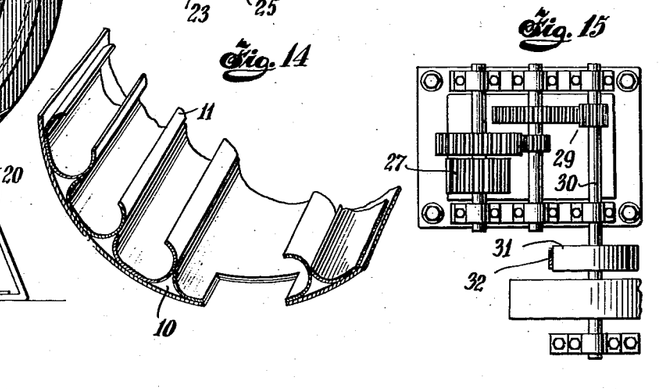
Fig. 14 is a detailed view of the interior of the drum showing the construction of the buckets.
Fig. 15 is a detail plan view showing the driving gearing for rotating the drum.
Figure 16:
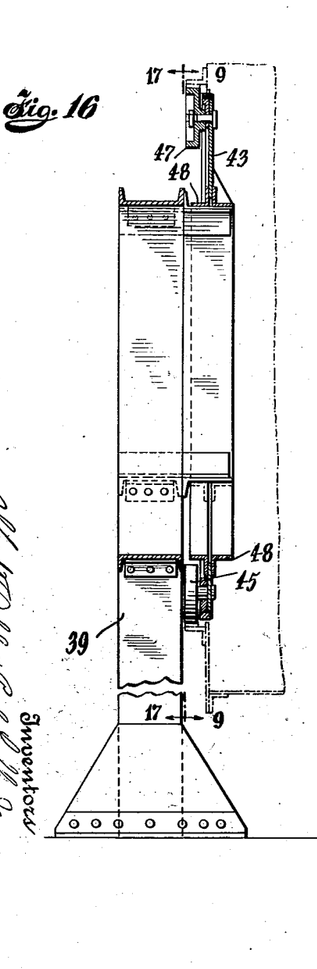
Fig. 16 is a detail sectional view showing a part of the structural steel support for the conduits which conduct the drying gases to and from the drum taken on the line 16—16 of Fig. 17.
Figure 17:
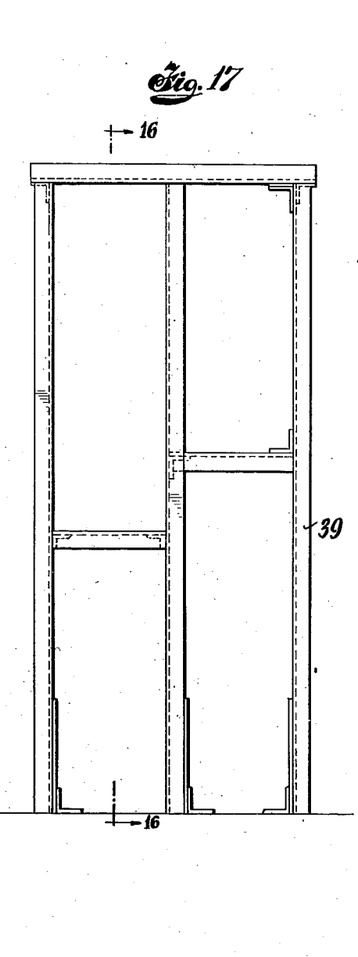
Fig. 17 is a detail view in elevation of the same.

In the apparatus shown for the purposes of illustrating the principles of the invention, a rotatable drying drum 10 is arranged to be charged with a quantity of granulated reclaimed rubber to be dried. As the drum rotates, the material is tumbled as by means of buckets 11 secured to the inner face of the drum, as best shown in Figs. 13 and 14, in order that all of the material may contact with the drying gases which are conducted into the drum as from a furnace 13, Figs. 1 and 2, by means of suitable conduits or flues 14 and 15 and the same gases after being charged with moisture extracted from the material to be dried, are conducted from the drum by means of the conduits or flues 16 and 17. A suitable suction fan 18 maintains the circulation of the drying gases through the drum.

Figure 12:
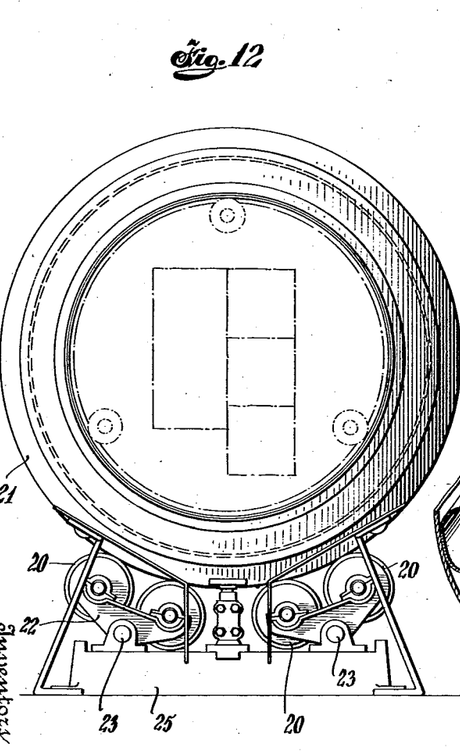
Fig. 12 is an end view showing the mechanism for supporting the drum.

The drum which is of generally cylindrical shape is rotatably mounted on suitable rollers 20 as best shown in Figs. 2, 4, 12, and 13. The drum is provided with suitable steel bands or tires 21 arranged to engage the rollers 20. In order that the pressure of the drum on the supporting rollers 20 may be evenly distributed, the rollers are mounted in pairs in yokes 22, each yoke being pivoted at an intermediate point, as indicated at 23, in a supporting base 25, as best shown in Fig. 12.

Figure 1:
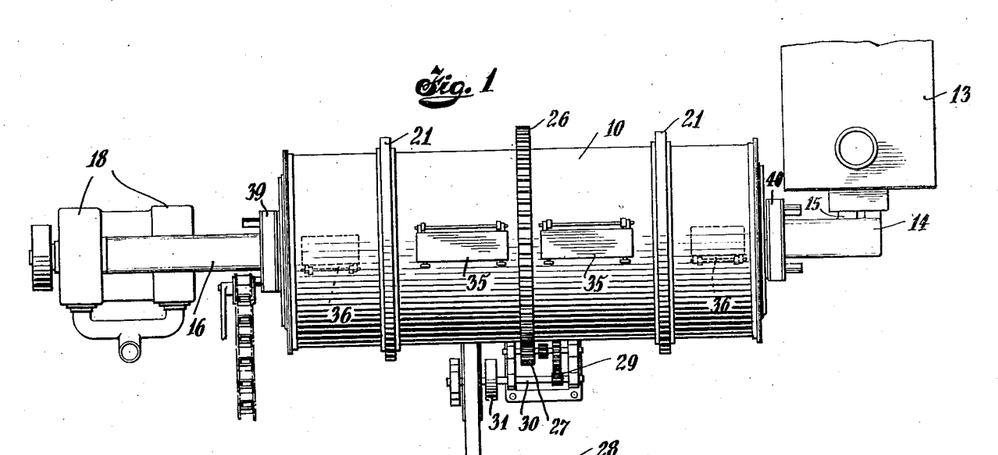
Fig. 1 is a plan view of apparatus for use in drying granulated reclaimed rubber.
Figure 2:
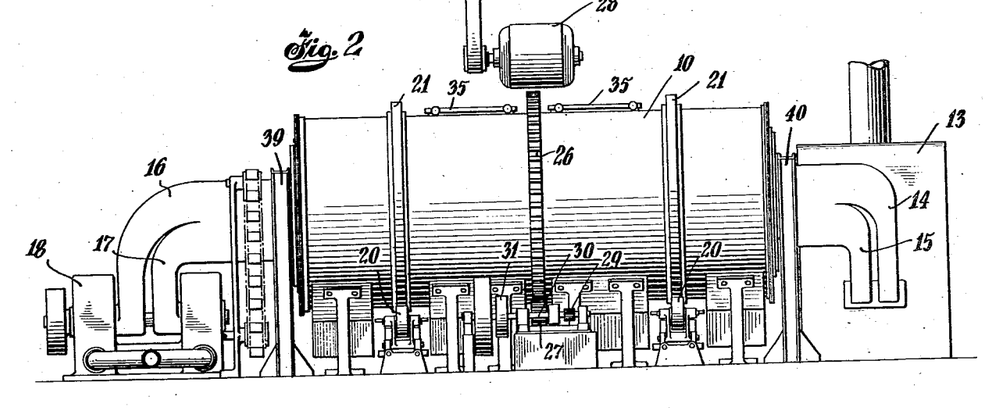
Fig. 2 is a view of the same in front elevation.

In order to rotate the drum, a suitable annular gear 26 is secured to the drum midway of its length which annular gear is driven by a pinion 27, Figs. 2, 13 and 15. This pinion is driven from a motor 28, Fig. 1, through a reducing gearing 29 shown in Figs. 1 and 15. The driving shaft 30 of this reducing gearing is provided with a brake drum 31 which is engaged by a brake band 32 arranged to be applied to lock the drum in fixed position when desired as, for example, when discharging the drum or when it is desirable for an operative to enter the same as for cleaning out the treated material or for inspection or repairs.

The buckets 11 arranged on the interior of the drum to carry the material being dried upwardly and drop it through the hot gases within the drum may be formed in any convenient way. As shown, they are of such shape they may be made of tubular material by simply splitting the tube longitudinally and flattening one side thereof. As shown, in Figs. 13 and 14, one edge of each tube is positioned against and preferably secured to the load carrying part of the next adjacent bucket to brace the same. In order to make provision for removing the dried material from the drum, suitable cover doors 35 and 36 are provided as best shown in Fig. 1. The doors 35 are positioned on one side of the drum and the doors 36 on the diametrically opposite side in order that the weight of one pair of doors may balance the weight of the other pair.

Flues or conduits 37 and 38 extend longitudinally through the drum and are arranged to distribute the drying gases throughout the drum and to conduct the same gases when charged with moisture from the drum. These conduits are nonrotatably supported on structural steel columns 39, and 40 at opposite ends of the drum. It is convenient to close the ends of the drum by means of end plates which also do not rotate with the drum. The arrangement of the end plates and the associated parts will be best understood by a study of Figs. 5, 6, 16 and 17.

Figure 5:
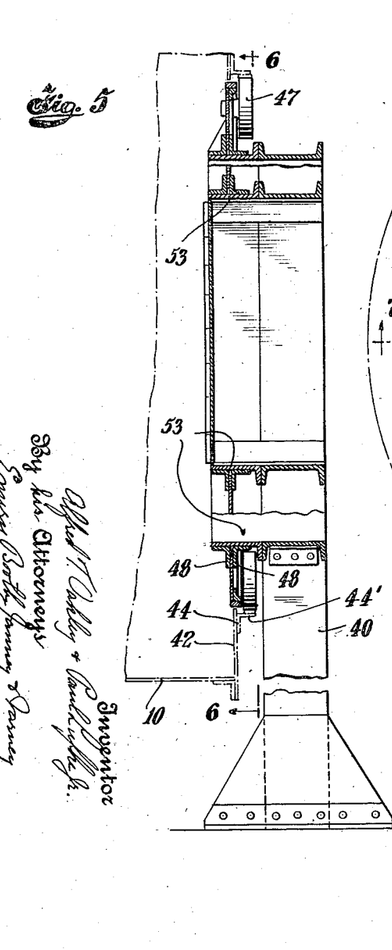
Fig. 5 is a vertical sectional view taken on the line 5—5 of Fig. 6 on the axis of the drum showing certain details of the inlet end thereof.
Figure 6:
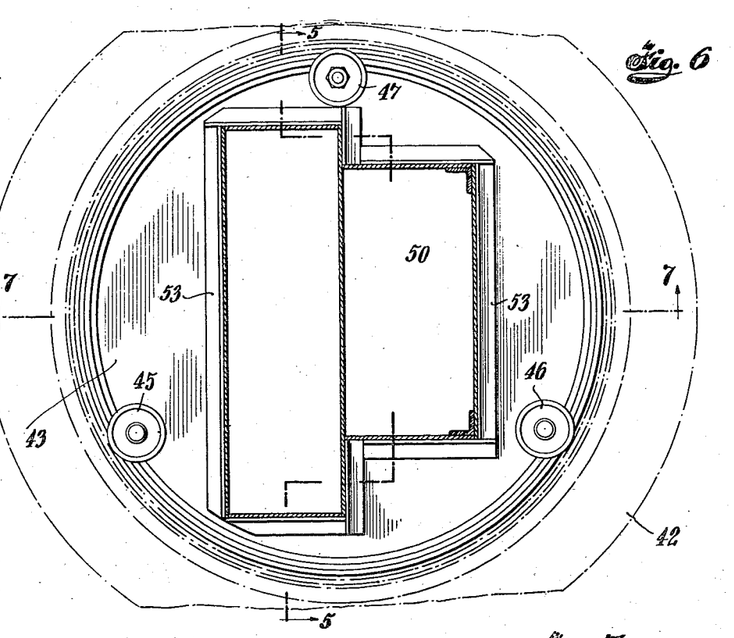
Fig. 6 is a view in end elevation of the furnace end of the drum taken on the line 6—6 of Fig. 5.
Figure 7:
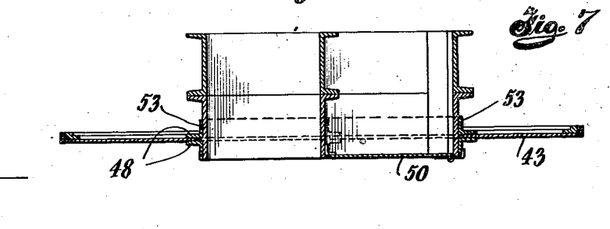
Fig. 7 is a detail sectional view taken on the line 7—7 of Fig. 6.
Figure 18:
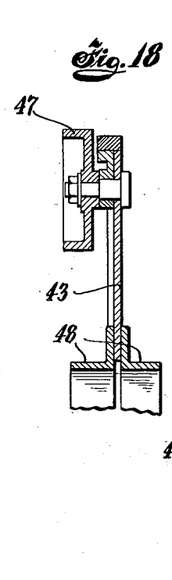
Fig. 18 is a detail sectional view taken on the line 18—18 of Fig. 9 showing one of the upper guide rollers which serve to maintain the drum heads in position during the rotation of the drum.
Figure 19:
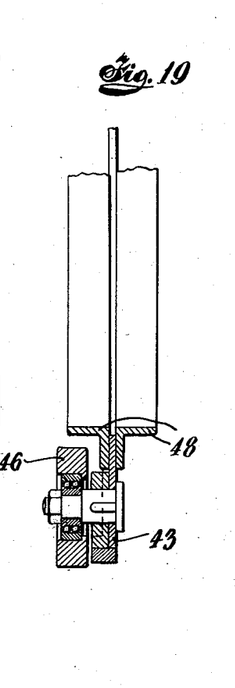
Fig. 19 is a detail sectional view taken on the line 19—19 of Fig. 9 showing one of the lower guide rollers.

As shown in Figs. 5 and 6 the furnace end of the drum 10 is formed with annular plate 42 the central aperture of which is closed by the end plate 43. As shown, an annular flange 44 is secured to the end plate 42 to provide a suitable track which is engaged by rollers 45, 46 and 47 which in part support and maintain the end plate 43 in position in the central opening of the end of the drum. The lower rollers 45 and 46 are preferably mounted upon roller bearings to reduce the friction inasmuch as these carry the weight of the end plate 43. The upper rollers 47 serve as a guide but ordinarily carry no substantial weight and for this reason need not be mounted on roller bearings. The mountings or the rollers 46 and 47 are shown in detail in Figs. 18 and 19 and will be sufficiently understood without more detailed explanation thereof.

It is impractical to construct the drum with such accuracy that the annular track 44 will run perfectly true and therefore the end plate 43 moves slightly during the rotating of the drum. For this reason the end plate is mounted relative to the structural steel support 40 and the flues supported thereby in a manner to permit limited movement.

As shown, the end plate 43 is received at its inner edge between flanges 48 secured to the flues and associated structure, these flanges being sufficiently spaced to permit the movement of the end plate without excessive friction.

The arrangement at the charging end of the drum is similar to that at the furnace end above described and comprises an end plate 42 forming part of the drum with a movably mounted end plate 43.

Convenient access to the interior is provided by a door 50 at the furnace end of the drum. The central opening in the end plate 43 for the flues and the door 50 is outlined by the frame 53, of which the flanges 48 form a part. The frame 53 is rigidly connected to the flue and the support 40.

Figure 9:
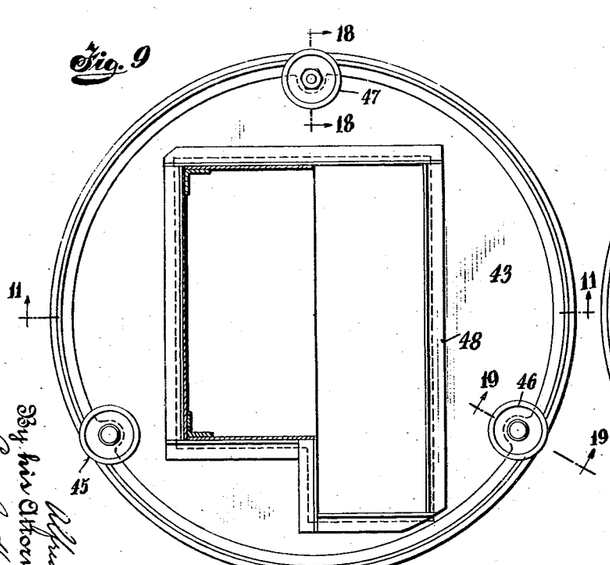
Fig. 9 is a view of certain details of the end plate at the charging end of the drum.
Figure 10:
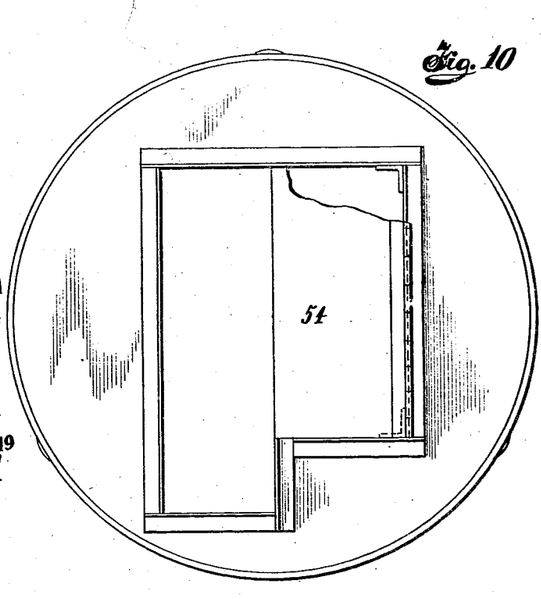
Fig. 10 is a detail view of the same end plate showing the inner face thereof.
Figure 11:
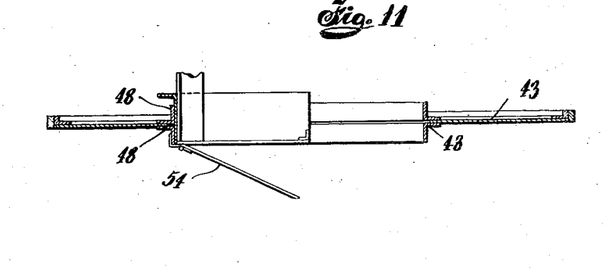
Fig. 11 is a detail sectional view of the end plate at the charging end of the drum taken on the line 11—11 of Fig. 9.

At the charging end, the arrangement is in general similar to that at the furnace end as shown in Figs. 9, 10 and 11. A door 54 is provided to permit access to the interior of the drum and to permit charging of the drum by material carried thereto by a suitable conveyor.

The construction of the conduits for the drying gases within the drum is best shown in Figs. 20 to 24. The lower flue 38 which conducts the moisture charged gases from the drum is secured directly to channel bars 55 and 56 which extend longitudinally through the drum and are supported at their ends on the structural steel columns 39 and 40. This flue 38 is provided with inlet openings 57 distributed along the length of the flue so as to draw the gases from all parts of the drum. The flue is tapered, its larger end lying at the charging end of the drum where the moisture laden gases leave the drum.

The upper flue 37 rests on the flue 38 and is tapered in the opposite direction, the larger end being at the furnace end of the drum where the hot drying gases enter. This flue is provided with outlet openings 58 and 59 on opposite sides respectively and distributed along the upper edge thereof.

Figures 20, 21, 25, 26:
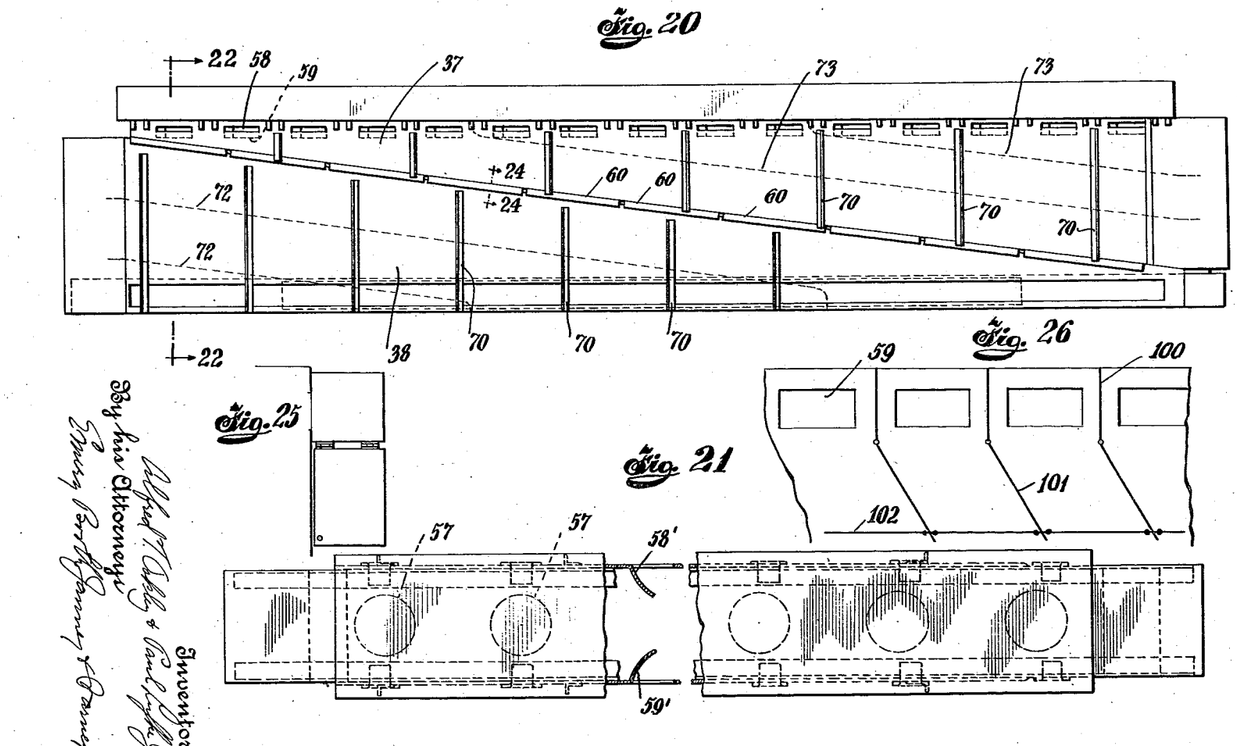
Fig. 20 is a detail view of the conduits positioned within the drum for distributing the drying gases throughout the drum and conducting the same from the drum.
Fig. 21 is a plan view of the same.
Fig. 25 is a detail view showing one of the deflectors for directing the falling material toward the furnace end of the drum.
Fig. 26 is a detail view showing the deflectors and the operating rod therefor.

These flues are positioned toward one side of the drum as indicated in Fig. 6 and the greater proportion of the material to be dried falls behind these flues. For this reason the openings 59 on the rear side of the flue 56 are made substantially larger than the openings on the front side thus admitting the greater proportion of the drying gases to that part of the drum where there is the greater quantity of material to be dried. In view of the velocity of the gases in the flue 37, it is desirable to provide deflecting means at the outlet openings 58 and 59 to cause the entering gases to flow transversely to the axis of the drum in order that the lighter material will not be blown toward the end of the drum. As shown, curved deflector blades 58' and 59' are arranged adjacent to these outlets as best shown in Fig. 21.

Figure 24:
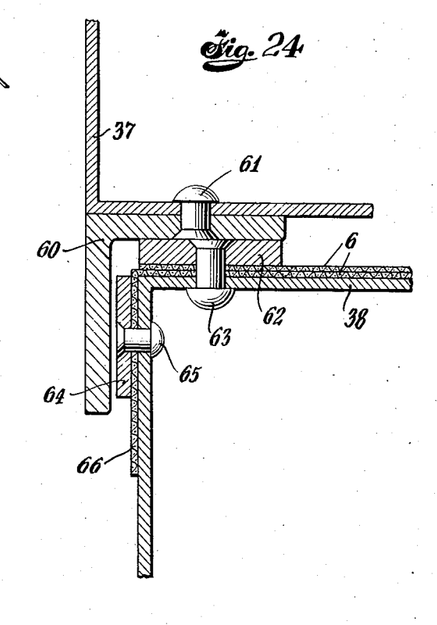
Fig. 24 is a detail sectional view taken on the line 24—24 of Fig. 20 showing a detail of the construction of the conduit.

The temperature of the flue 37 conducting the hot drying gases into the drying chamber will be considerably higher than the temperature of the flue 38 which carries the moisture laden gases and for this reason it will expand to a substantial extent longitudinally. In order to make allowance for this expansion and to prevent any buckling of the flues the upper flue is so mounted as to permit longitudinal movement thereof on its support as expansion and contraction occur. This arrangement is best shown in Fig. 24 wherein the angle bars 60 are shown secured to the upper flue 37 as by means of rivets 61 and these angle bars rest upon strips of bar-iron 62 secured by rivets 63 to the lower flue 38. Preferably the angle bars 60 and strips 62 are relatively short sections rather than continuous bars extending the whole length of the flues in order that unequal expansion of the flues and bars may not cause buckling.

The depending flanges of the angle bars 60 may engage strips of bar-iron 64 secured by rivets 65 to the lower flue 38. Preferably suitable insulation 66 such as asbestos is positioned between the strips 62 and 64 and the flue 38 to prevent the heat of the upper flue being transmitted to the lower flue. This insulation may extend over the whole of the top of the lower flue. The sides of the flues are preferably stiffened by suitable means such as the angle bars 70 as indicated in Fig. 20.

Figure 22:
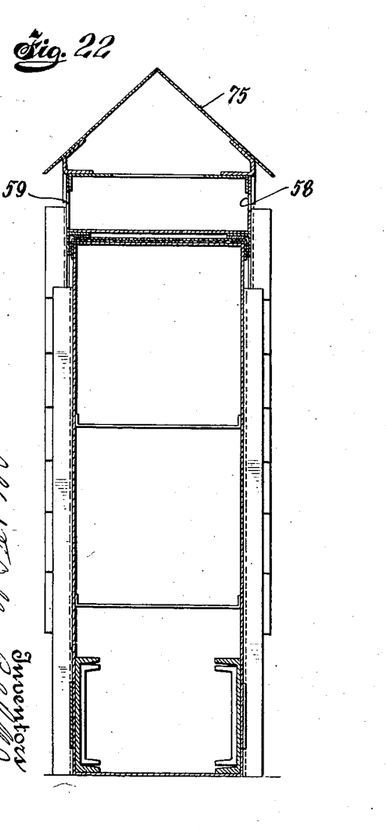
Fig. 22 is a sectional view taken through the conduits on the line 22—22 of Fig. 20.
Figure 23:
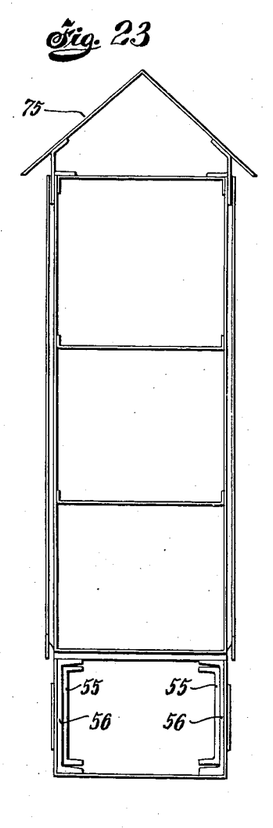
Fig. 23 is a view in end elevation of the conduits taken at the furnace end of the drum.

It is desirable to provide longitudinal partitions 72 and 73 in the flues in a manner to divide the flues. This expedient improves the distribution of the drying gases in the different parts of the drum and equalizes the drying effect. In order to prevent the material being dried from falling on top of the upper flue and collecting there a suitable sloping cover 75 is supported above the same in position to deflect the falling material as best shown in Figs. 22 and 23.

In order that the maximum drying effect may be maintained while avoiding burning of the material being dried, it is desirable to provide suitable temperature regulating means. In the apparatus shown, the desired control is obtained by controlling the flow of gases from the furnace and the proportion of relatively cold air admitted to the conduits with the furnace gases. The amount of furnace gases entering the drying apparatus is controlled by controlling the adjustable draft damper 80 of the furnace. Air is admitted to said conduits through adjustable dampers 81 which dampers ordinarily may be set by hand and need not be subject to the automatic control means, the proportion of air and combustion gases being sufficiently determined by the control of the draft damper 80.

In order to make provision for admission of addition of cold air to the conduits in the event that control of the furnace damper 80 is not sufficient, there are provided safety dampers 82 which are normally closed but which may be opened automatically if necessary.

Figures 3, 8:
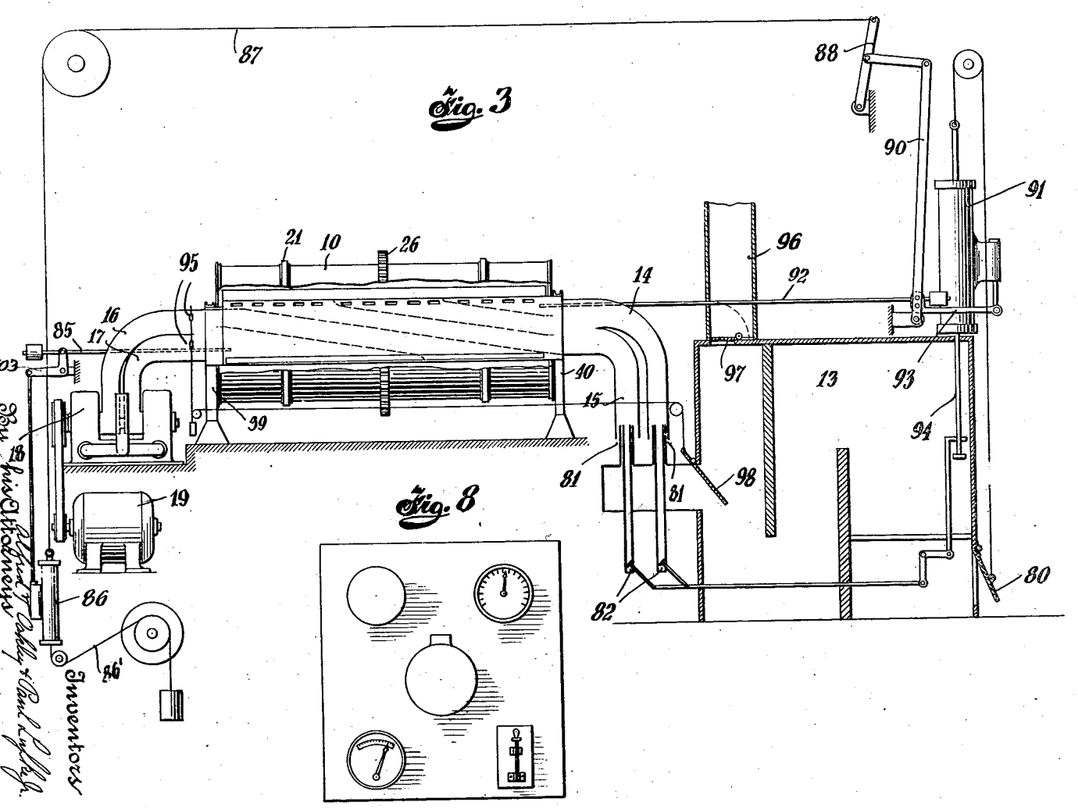
Fig. 3 is a diagrammatic view of the apparatus showing the arrangement of the automatic damper controlling means.
Fig. 8 is a diagrammatic view of the control board showing the arrangement of the temperature indicators and the control switch for the blower motor.
Figure 4:
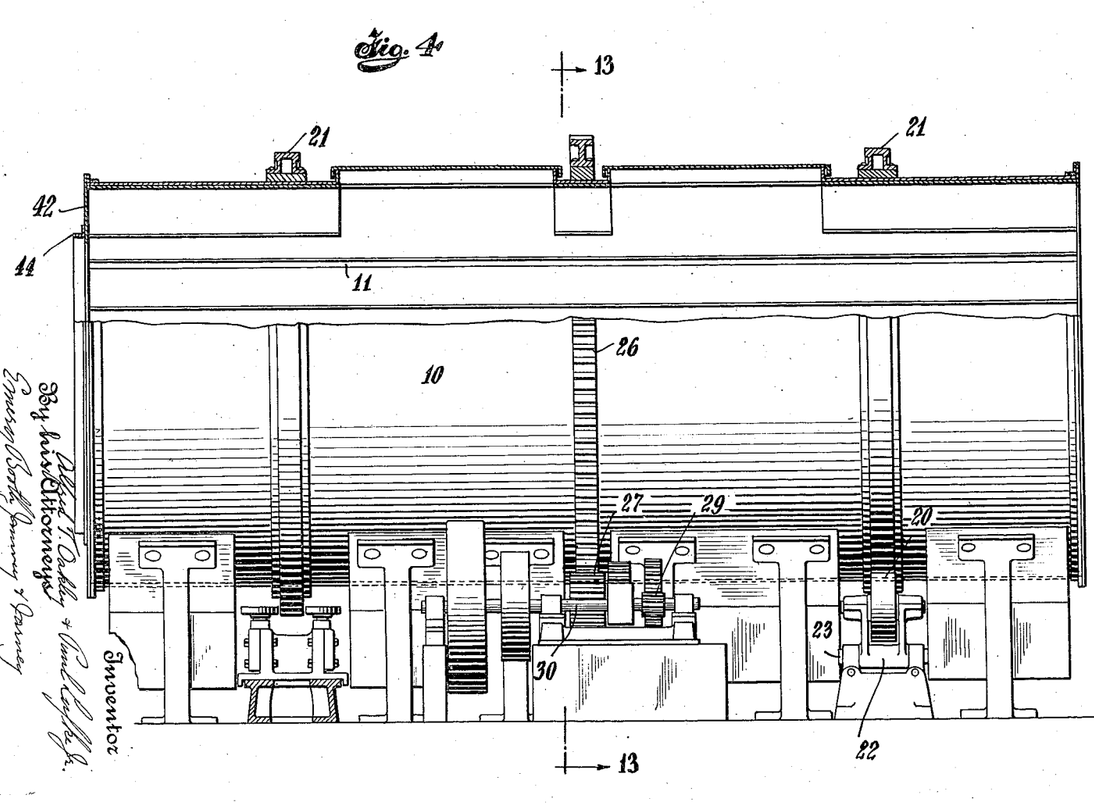
Fig. 4 is a view partly in rear elevation and partly in section showing the driving mechanism for rotating the drum.

The automatic damper controlling mechanism is best shown in Fig. 3. As illustrated, a thermostat rod 85 is suitably positioned in the exhaust conduit to be controlled by the temperature of the exhaust gases. This thermostat rod is connected to control the floating pilot valve of the compensator type damper regulator 86. The regulator may be of any suitable construction such, for example, as that sold by the Hagan Corporation of Pittsburg, Pennsylvania. The operative piston of the air cylinder of this damper regulator is connected as by a chain 87 to a lever 88 which in turn is link-connected to a setting arm 90 of a second compensator type damper regulator 91. The lower end of the piston rod of the damper regulator is connected by means of a chain 86' to a dial type field rheostat to control the speed of the fan motor 19. Ordinarily as the temperature of the exhaust gases rises it is desirable to reduce the speed of the fan but the apparatus may be designed to operate otherwise if desired. A second thermostat rod 92 is positioned in the inlet flue of the drier to be controlled by the temperature of the entering gases. The bell crank lever 93 is thus controlled differentially.

The piston rod 94 is suitably connected to operate the furnace damper 80. It is also connected to open the cold air dampers 82 of the inlet air flues 14, 15 upon excessive movement.

It will be noted that, as the temperature of the exhaust gases tends to rise as the drying operation progresses and there is less moisture being absorbed by the drying gases, the thermostat rod, 85, will cause the arm, 103, to be positioned one side of its normal position so that temperature rise of the exhaust gases is prohibited through the reduction of the fan speed by means of the damper regulator acting on the field rheostat of the fan motor; thus making suitable allowance for the condition of the material and avoiding burning thereof. Simultaneously, the regulator, 86, through the chain 87, and levers, 88 and 90, alters the setting point of the regulator 91 so that the inlet temperature is gradually reduced as an additional precaution against overheating and consequent deterioration of the material being dried.

The furnace is connected to a suitable stack 96 to facilitate starting fires therein, the connection with the stack being controlled by a damper 97 which may be closed when the operation of the drier is begun. The connection between the furnace and the drier conduits may be closed by a damper 98 if desired.

A safety device may be provided if desired to stop the fan and close the several inlet dampers in the event of a fire occurring in the drier. As shown, an automatic device comprising fusible links 95 positioned in the exhaust conduit together with connections to the several dampers is provided for this purpose.

In Figs. 25 and 26 is shown a series of adjustable deflector blades secured to the outside of the flue 37 arranged to direct the falling material toward the furnace end of the drum. The current of air and furnace gas tends to carry the material toward the charging end. If the deflector blades 58', 59' do not entirely overcome this action the deflectors shown in Figs. 25 and 26 may be used. As shown vertical plates 100 are positioned between successive air ports 59 to the lower edges of which are hinged the adjustable deflector blades 101. A rod 102 engages the lower ends of the blades and is movable longitudinally of the drum to vary the angle of the blades.

The foregoing description is illustrative merely and is not intended as defining the limits of the invention.

We claim:

1. In drying apparatus of the character described, in combination, a rotatable drum, means for circulating gases through said drum comprising an inlet and outlet conduits supported independently of the drum but within the drum and having spaced openings distributed along the length of the drum substantially as and for the purpose described.

2. In drying apparatus of the character described in combination, a rotary drum and means for circulating gases through said drum comprising conduits supported independently of the drum within the drum, one of said conduits being free to move relative to its support upon expansion and contraction relative thereto.

3. In drying apparatus of the character described in combination, a rotary drum and means for circulating hot gases through said drum comprising a structural steel support independent of the drum and extending longitudinally therethrough, a conduit supported on said structural steel support and movable longitudinally thereof upon expansion and contraction, said conduit having openings distributed along the length of the drum.

4. In apparatus for drying granulated reclaimed rubber in combination, a rotatable drum and means for circulating gases through said drum comprising a structural steel support extending longitudinally through said drum, conduits carried thereby for introducing dry gases and removing moisture charged gases respectively, one of said conduits being supported to permit longitudinal movement relative to the other upon relative expansion.

5. In apparatus for drying granulated reclaimed rubber, in combination, a rotatable drum, a furnace, means for conducting the heated gaseous products of combustion from the furnace to the interior of the rotatable drum comprising a conduit supported within said drum but independent thereof, a second conduit for conducting the moisture laden gases from the drum and means controlled by the temperature of the moisture laden gases for regulating the flow of gaseous products of combustion from the furnace to the drum.

6. In apparatus for drying granulated reclaimed rubber, in combination, a rotatable drum, a structural steel support extending longitudinally through said drum independently thereof, a furnace, a conduit for conducting the products of combustion from said furnace to said drum comprising a conduit supported on said structural steel support for longitudinal movement to permit expansion and contraction thereof, an inlet damper for admitting air to said conduit and temperature controlled means for actuating said damper and for controlling the flow of the products of combustion from said furnace.

7. Apparatus of the character described for drying granulated reclaimed rubber comprising, in combination, a rotatable drum, a furnace, a conduit for conducting the gaseous products of combustion from said furnace to said drum said conduit having an air inlet, a structural steel support extending longitudinally through said drum, conduits carried by said support in overlapped relation and connected to permit relative movement upon unequal expansion, said conduits being tapered with the larger end of one conduit at the inlet end of the drum and the larger end of the other conduit at the outlet end of the drum, a fan for maintaining circulation through said conduits and temperature controlled regulating means for controlling the draft of the furnace and the air inlet.

8. In drying apparatus of the character described in combination, a drum, a conduit receiving hot gases from one source and cold gases from another source and conducting these gases into the drum, a conduit for conducting used gases from the drum, and means responsive in part to the temperature of the used gases and in part to the temperature of the incoming gases for controlling the relative quantities of hot and cold gases entering said first mentioned conduit.

9. In drying apparatus of the character described in combination, a rotatable drum and a fixed conduit disposed within said drum, said conduit defining unequal spaces on either side thereof with the sides of the drum and said conduit having lateral apertures on opposite sides of unequal area.

10. In drying apparatus of the character described in combination, a rotatable drum, a fixed conduit for conducting gases into said drum, said conduit being provided with adjustable deflectors on its interior, and means to move several of said deflectors simultaneously.

11. In drying apparatus of the character described, in combination, a drum, a conduit for conducting hot gases into said drum, a second conduit for conducting used gases from said drum, and means responsive to the temperature of both the used gases and the incoming gases for regulating the temperature of the incoming gases.

In testimony whereof, we have signed our names to this specification the 23d and 16th days of October, respectively.

ALFRED T. OAKLEY.
PAUL LUPKE, Jr.